(12) United States Patent
Riggers

(10) Patent No.: US 9,211,489 B2
(45) Date of Patent: Dec. 15, 2015

(54) SELF-CLEANING FILTER MODULE

(75) Inventor: Wilfried Riggers, Bremervörde (DE)

(73) Assignee: GEA WESTFALIA SEPARATOR GROUP GMBH, Oelde (DE)

(*) Notice: Subject to any disclaimer, the term of this patent is extended or adjusted under 35 U.S.C. 154(b) by 602 days.

(21) Appl. No.: 13/582,266

(22) PCT Filed: Mar. 7, 2011

(86) PCT No.: PCT/SG2011/000089
§ 371 (c)(1),
(2), (4) Date: Dec. 13, 2012

(87) PCT Pub. No.: WO2011/112151
PCT Pub. Date: Sep. 15, 2011

(65) Prior Publication Data
US 2013/0087495 A1 Apr. 11, 2013

(30) Foreign Application Priority Data
Mar. 8, 2010 (SG) ................................ 2010016202

(51) Int. Cl.
*B01D 29/64* (2006.01)
*B01D 46/00* (2006.01)
*B01D 46/04* (2006.01)
(Continued)

(52) U.S. Cl.
CPC ............ *B01D 29/64* (2013.01); *B01D 29/6476* (2013.01); *B01D 29/682* (2013.01); *B01D 29/688* (2013.01); *B01D 46/0065* (2013.01); *B01D 46/04* (2013.01); *B08B 5/04* (2013.01); *B01D 29/23* (2013.01); *B01D 2201/082* (2013.01); *B08B 9/00* (2013.01)

(58) Field of Classification Search
CPC .... B01D 29/23; B01D 29/64; B01D 29/6476; B01D 29/682; B01D 29/686; B01D 26/688; B01D 2201/081; B01D 2201/082; B01D 46/04; B01D 46/0065; B01D 46/0067; B01D 46/0071; B08B 5/04; B08B 9/00
USPC ...................... 210/411, 413, 415; 55/301, 302
See application file for complete search history.

(56) References Cited

U.S. PATENT DOCUMENTS 1,995,649 A   3/1935  Rathbun
3,574,509 A * 4/1971  Zentis et al. .................. 210/107
(Continued)

*Primary Examiner* — Joseph Drodge
(74) *Attorney, Agent, or Firm* — Saliwanchik, Lloyd & Eisenschenk

(57) ABSTRACT

A filter module according to the present invention comprises a housing having an inlet and an outlet, said housing enclosing a tubular, elongate filter element defining a longitudinal axis and a cleaning head connected by means of a conduit to a coaxially arranged and rotatably mounted pipe, said cleaning head being resiliently biased towards the internal surface of said tubular, elongate filter element. Moreover, said cleaning head has an opening of adjustable size facing said internal surface of said filter element and providing fluid communication between the interior of said housing and the interior of said pipe. The filter module further com¬prises means for creating a pressure difference between the interior of said housing and the interior of said pipe so as to cause a fluid flow from the interior of said housing to the interior of said pipe as well as means for effecting a rotation of said pipe. Said filter module further comprises a spacer element rotatably supported on and releasably attached to said cleaning head, said spacer element defining the minimum spacing between the cleaning head and the internal surface of said filter element.

16 Claims, 3 Drawing Sheets

(51) Int. Cl.
  *B01D 29/68* (2006.01)
  *B08B 5/04* (2006.01)
  *B01D 29/23* (2006.01)
  *B08B 9/00* (2006.01)

(56) References Cited

U.S. PATENT DOCUMENTS

| | | | |
|---|---|---|---|
| 3,757,496 A | 9/1973 | Berg | |
| 4,154,588 A | 5/1979 | Herndon, Jr. | |
| 4,740,221 A * | 4/1988 | Howeth | 55/302 |
| 5,389,256 A * | 2/1995 | McEwen et al. | 210/346 |
| 5,554,284 A * | 9/1996 | Bartelt et al. | 210/356 |
| 5,632,903 A * | 5/1997 | Caracciolo, Jr. | 210/741 |
| 5,827,338 A * | 10/1998 | Horvat | 55/285 |
| 6,267,879 B1 * | 7/2001 | Gil | 210/107 |
| 2004/0238435 A1 * | 12/2004 | Olson | 210/413 |
| 2008/0272058 A1 * | 11/2008 | Olson | 210/741 |

* cited by examiner

SELF-CLEANING FILTER MODULE

CROSS REFERENCE TO A RELATED APPLICATION

This application is a National Stage Application of International Application Number PCT/SG2011/000089, filed Mar. 7, 2011; which claims priority to Singapore Application No. 201001620-2, filed Mar. 8, 2010; all of which are incorporated herein by reference in their entirety.

The invention relates to the technical field of self-cleaning filter modules.

From U.S. Pat. No. 3,887,344 a filter having a self-cleaning capability is known. The filter module described therein comprises a cylindrical housing having one closed end and one open end and being provided with filter media around the circumference thereof. The filter media has at least one area thereacross that extends outwardly, away from suction nozzles so as to permit large dirt particles, accumulations, and the like to be received therein and removed by suction nozzles passing thereover. A suction manifold is rotatably received in the closed end of the filter and sealed thereat while likewise being rotatably supported at the open end of the filter by a plurality of roller supports. At the open end of the filter the manifold is connected to a suction source where it is sealed by rotary self-sealing means. Suction nozzles are spaced along the length of the manifold equidistant therearound so as to provide balance thereto. The suction nozzles reside immediately adjacent the filter media so as to automatically clean same during rotation of the manifold.

A similar concept is disclosed in EP 0 131 348. The automatic back flushing filter module described therein comprises a cylindrical tubular filter positioned in a housing so that fluid flow is from inside the filter to the outside. Disposed in the filter are a pair of wings with open mouths facing the filter interior. When excess contaminants accumulate on the filter interior the wings are made to rotate to receive the contaminants and thus clean the filter.

The open mouths facing the filter interior are arranged immediately adjacent the filter interior and in an abutting relationship therewith. Accordingly, during cleaning, the sections of the wings surrounding the mouths are subjected to substantial abrasive wear upon sweeping along the filter interior.

Moreover, once installed, the only parameters which can be controlled to adjust the cleaning action are the rotational speed of the wings and the suction pressure inside the pipe to which the wings are attached relative to the pressure inside the housing.

It is therefore an object of the present invention to provide a self-cleaning filter module having improved longevity and requiring less frequent servicing.

It is a further object of the present invention to provide a self-cleaning filter module with improved control over the cleaning action.

The filter module according to the present invention comprises a housing having an inlet and an outlet, said housing enclosing a tubular, elongate filter element defining a longitudinal axis and a cleaning head connected by means of a conduit to a coaxially arranged and rotatably mounted pipe, said cleaning head being resiliently biased towards the internal surface of said tubular, elongate filter element.

Moreover, said cleaning head has an opening of adjustable size facing said internal surface of said filter element and providing fluid communication between the interior of said housing and the interior of said pipe. The filter module further comprises means for creating a pressure difference between the interior of said housing and the interior of said pipe so as to cause a fluid flow from the interior of said housing to the interior of said pipe as well as means for effecting a rotation of said pipe.

Said filter module further comprises a spacer element rotatably supported on and releasably attached to said cleaning head, said spacer element defining the minimum spacing between the cleaning head (being resiliently biased towards said internal surface of said filter element) and the internal surface of said filter element.

According to the filter module of the present invention, it is the spacer element protruding beyond said cleaning head towards said internal surface of said filter element rather than the perimeter surrounding the opening of said cleaning head being in contact with the internal surface of said filter element. Abrasive wear acting on the cleaning head is thereby reduced or even avoided altogether. Since the spacer element is rotatably supported on said cleaning head, abrasive wear acting on the spacer element itself is minimised.

What is more, since the size of the opening on said cleaning head is adjustable and since the size of the spacer element and thus the minimum spacing between the cleaning head and the internal surface of said filter element may be changed by replacing the releasably attached spacer element, the overall cleaning action for rejuvenating said filter element can be more precisely controlled.

In a particular preferred embodiment, said filter module comprises at least a second cleaning head connected by means of a second conduit to the pipe, said second cleaning head being resiliently biased towards the internal surface of said tubular, elongate filter element, having at least a further spacer element rotatably supported thereon and releasably attached thereto, and having an opening of adjustable size facing said internal surface of said filter element and providing fluid communication between the interior of said housing and the interior of said pipe. Preferably, the cleaning heads are offset angularly and/or along the longitudinal axis relative to one another.

According to another particularly preferred embodiment, the position of said (further) spacer element on said cleaning head (i.e., relative to said cleaning head) is adjustable thereby gaining control over the minimum spacing between the cleaning head and the internal surface of said filter element. To this end, said spacer element may be rotatably supported on and releasably attached to said cleaning head at different positions thereon. The minimum spacing between the cleaning head and the internal surface of said filter element may thus be changed (either continuously or in discrete steps) and set to a desired spacing without having to change the size of the spacer element. By being able to adjust both the size of the opening and the minimum spacing between the cleaning head and the internal surface of said filter element, the overall cleaning action for rejuvenating said filter element can be controlled even more precisely and conveniently.

Said spacer element may be shaped like a disc, i.e., like a thin flat round object, thereby providing only a relatively small area in contact with the internal surface of said filter element.

Preferably, said spacer element is made of a material which is (slightly) softer than the material of said filter element so as to wear down the simpler to replace spacer element during use rather than the filter element.

Preferably, said cleaning head extends along the longitudinal axis of said filter element, said cleaning head having a first end and an opposed second end. Thereby, the cleaning head is configured to sweep across an area of the internal surface of said filter element, the height of which along the longitudinal axis being defined by the distance between the first end and the second end.

Said opening may be a slit. Preferably, said opening is orientated substantially parallel to the longitudinal axis of said filter element. In a particular preferred embodiment said opening extends between the first end and the second end of said cleaning head thereby causing a homogeneous cleaning action substantially along the entire distance between the first end and the second end of said cleaning head.

Preferably, said spacer element is arranged at one of said first and second ends of said cleaning head. In a particularly preferred embodiment, a first spacer element is rotatably supported on and releasably attached to said first end of said cleaning head and a second spacer element is rotatably supported on and releasably attached to said second end of said cleaning head.

Preferably, the size of said opening is adjustable using restriction elements being releasably attached to said cleaning head. The size of the opening may be adjusted either by replacing a given restriction element with another one having a different size or by rearranging a given restriction element and releasably attaching the same at a different position. In a particularly preferred embodiment, the size of said opening is adjustable in a direction different from the one defined by the longitudinal axis of said filter element.

Said conduit may comprise a pair of ducts each of which ducts being connected at its first end to the coaxially arranged (in respect of said filter element) and rotatably mounted (inside said housing) pipe and at its second end to the (same) cleaning head. The pair of ducts, being spaced along the longitudinal axis, provide for improved mechanical stability of the cleaning head relative to the pipe.

Said housing may also be of a drum-like or tubular shape, wherein the housing, the filter element, and the pipe are arranged co-axially.

Moreover, the means for creating a pressure difference may be a simple valve which can be opened to connect the interior of the pipe to atmospheric pressure. In an alternative embodiment, said means for creating a pressure difference may be an active suction mechanism, such as a pump.

As an alternative or in addition to arranging the pipe in a rotatable fashion, the tubular, elongate filter element may be rotatably-mounted inside said housing.

Further features and advantages of the present invention will be apparent from the following detailed description and the accompanying figures.

Figure 1:
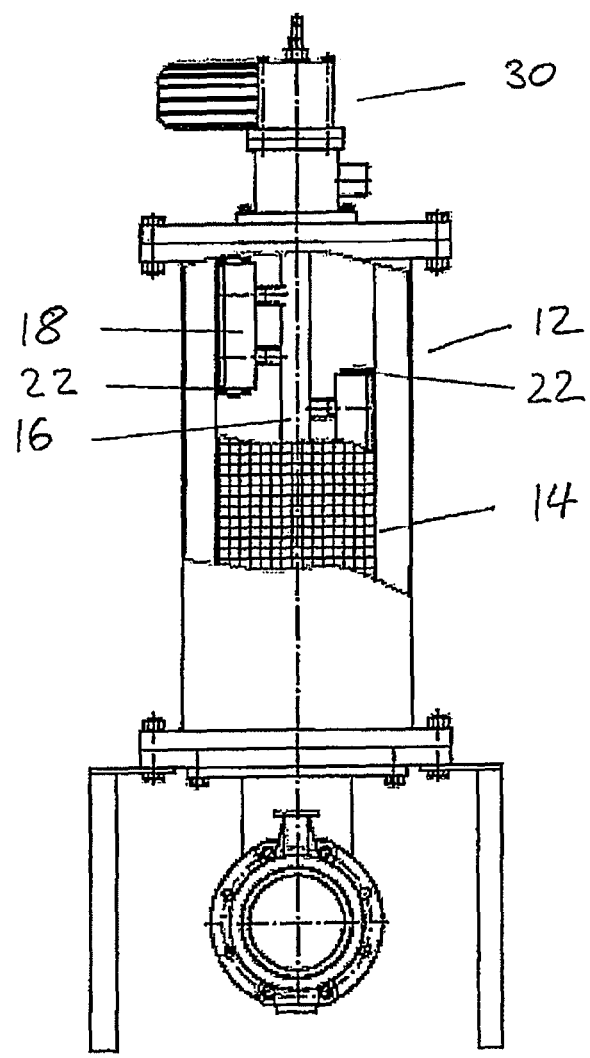
FIG. 1 shows a filter module having a housing enclosing a tubular filter element according to present invention.

In FIG. 1, an embodiment of a filter module 10 according to the present invention is shown. The filter module comprises a drum-shaped housing 12 having an inlet and an outlet, said housing enclosing a tubular, elongate filter element 14 being coaxially arranged inside said drum-shaped housing 12.

A rotatable pipe 16 is mounted inside housing 12. Said pipe 16 is coaxially arranged inside said tubular, elongate filter element 14. The upper end 26 of said pipe 16 is coupled with means 30 for effecting a rotation of said pipe 16. The lower end 28 of said pipe 16 is coupled to and in flow communication with means (not shown) for creating a pressure difference between the interior of said housing 12 and the interior of said pipe 16 so as to cause a (reverse) fluid flow from the interior of said housing 12 to the interior of said pipe 16. The means for creating a pressure difference may be a simple valve which can be opened to connect the interior of the pipe 16 to atmospheric pressure (i.e., to the exterior of housing 12). In an alternative embodiment, said means for creating a pressure difference may be an active suction mechanism, such as a pump.

Figure 2:
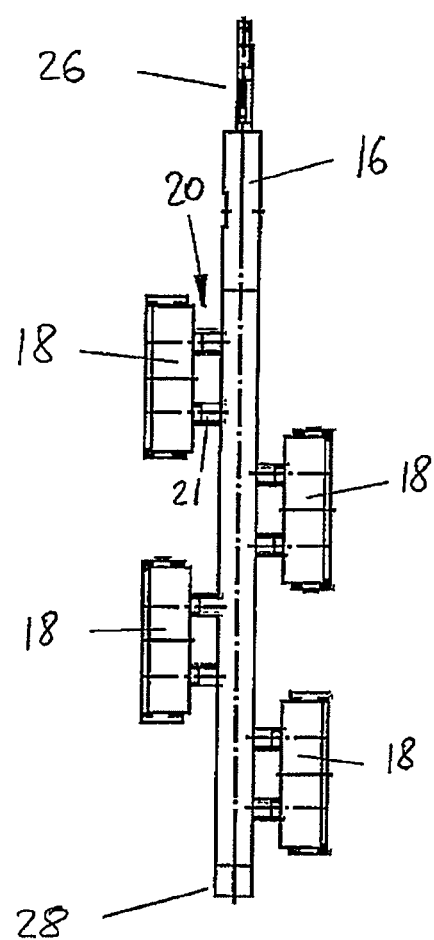
FIG. 2 shows a rotatable pipe with four cleaning heads arranged thereon, said pipe being coaxially arranged relative to said filter element and rotatably mounted inside said housing.

As can be seen from FIG. 2, four cleaning heads 18 are coupled to said pipe 16, each of which being mounted on said pipe 16 by means of a respective conduit 20. Each conduit 20, in turn, comprises a pair of ducts 21 providing fluid communication between the interior of said housing 12 and the interior of said pipe 16 via a respective opening 24 (shown in FIG. 3) on the respective cleaning head 18.

Each conduit 20 and the corresponding cleaning head 18 extend radially from the pipe 16 towards the internal surface of said tubular filter element 14, wherein said pipe 16 is arranged substantially parallel to the longitudinal axis of said tubular filter element 14. In other words, the conduits 20 and the cleaning heads 18 extend substantially at right angle to the longitudinal axis defined by the tubular filter element 14. In addition, each cleaning head 18 is resiliently biased towards said internal surface of said filter element 14 by means of a spring (not shown) so as to reside immediately adjacent said internal surface.

The cleaning heads 18 are displaced relative to one another both angularly and along the longitudinal axis. In the example shown in FIG. 2, the angular offset in between adjacent ones of the four cleaning heads 18 is approximately 90°. Along the longitudinal axis, the cleaning heads 18 are offset in such a way that upon rotation of the pipe 16 the four cleaning heads 18 sweep across the entire internal surface of said filter element 14.

The fluid to be filtered flows into said housing 12 via said inlet (not shown) and subsequently passes through the filter element 14 leaving unwanted material in said fluid on the internal surface of the filter element 14, i.e., the surface of said tubular filter element 14 facing inwardly constituting the upstream side of filter element 14. The thus filtered fluid then leaves the interior of the housing 12 via an outlet (not shown).

Said unwanted material builds up on the internal surface of said filter element 14 over time and increasingly reduces the achievable through-put of said filter element and thus the filter module at large.

To remove said unwanted material from the internal surface of said filter element 14, both said means 30 for effecting a rotation of said pipe 16 and said means for creating a pressure difference are actuated: since the interior of the pipe 16 and the interior of the housing 12 are in fluid communication via the openings 24, the relatively low pressure inside the pipe 16 thus generated causes a reverse flow of fluid through the filter element 14 to occur near each opening 24 whereby the unwanted material left on the internal surface of said tubular filter element 14 is loosened and sucked into the interior of pipe 16 via openings 24. The pipe 16 is rotated so as to sweep the cleaning heads across the entire internal surface of said filter element 14, which cleaning heads 18 are urged towards the internal surface of the filter element 14 by means of respective resilient members, as described above.

Said reverse flow, of fluid comprising the stripped unwanted material may then be treated or simply discarded.

Actuation of said means 30 for effecting a rotation of said pipe 16 and of said, means for creating a pressure difference may be effected continuously, periodically, or dependent on the desired fluid flow rate/through-put.

Having thus described the self-cleaning capability of a filter module according to the present invention, it will next be described in conjunction with FIGS. 3 and 4 how the cleaning action can be controlled.

Figure 3:
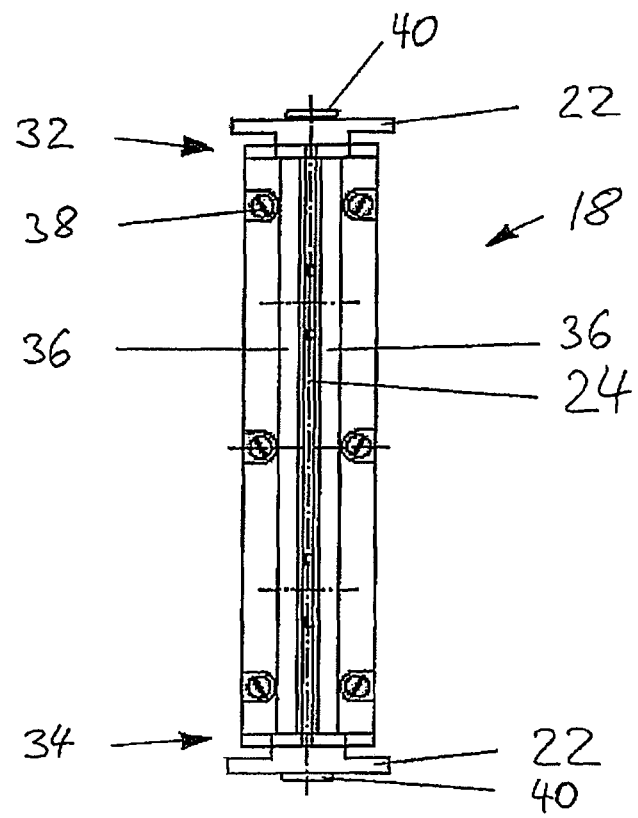
FIG. 3 is a view showing the opening on said cleaning head facing said internal surface of said filter element and two spacer elements attached to said cleaning head.

FIG. 3 shows a top view of the side of a cleaning head 18 facing the internal surface of filter element 14. Cleaning head 18 extends between a first, top end 32 and a second, bottom end 34 thereof along the longitudinal axis of said filter element 14. The opening 24 is provided in the form of a slit extending between the first end 32 and the second end 34 of the cleaning head 18 substantially parallel to the longitudinal axis of the filter element 14. The width of said slit-like opening 24 is defined by means of two laterally arranged restriction elements 36. The restriction elements 36 are releasably attached to said side of cleaning head 18 facing the internal surface of the filter element 14 by means of screws 38. One or both of said restriction elements 36 can be arranged on said cleaning head 18 at different positions thereby gaining control over the width of the slit-like opening 24. Alternatively, one or both of said restriction elements 36 can be replaced by a restriction element of a different size.

Each of disc-shaped spacer elements 22 is rotatably supported on and releasably attached to said cleaning head 18 at one of said ends 32, 34 thereof, wherein the axis of rotation of each of said spacer elements 22 is arranged substantially parallel to the longitudinal axis of said filter element 14. To this end, each disc-shaped spacer element 22 is releasably attached to a side face of said cleaning head by means of a respective screw 40.

Figure 4:
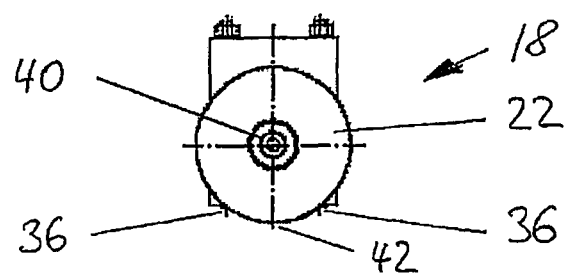
FIG. 4 shows a side view of a cleaning head showing the arrangement of the spacer element relative to the cleaning head.

As can be seen from FIG. 4, the disc-shaped spacer element 22 is mounted on said cleaning head 18 so as to protrude towards said internal surface of said filter element 14 (i.e., in a radial direction of said tubular filter element 14) slightly beyond the side of the cleaning head 18 facing said internal surface of the filter element 14 and the restriction element 36 arranged thereon. Thus, the disc-shaped spacer element 22 being arranged on the cleaning head 18, which is urged towards the internal surface the filter element 14, contacts the internal surface of said filter element 14 at a protruding section 42 of its perimeter. The disc-shaped spacer element 22, more specifically the protruding section 42 thereof, thus defines the (minimum) spacing between the cleaning head 18 as well as its slit-like opening 24 and the internal surface of the filter element 14.

Preferably, the material of the spacer elements 22 is a material, being slightly softer than the material of the filter element 14 so as to wear down the (replaceable) spacer element rather than the filter element 14 during cleaning.

Said minimum spacing can be controlled by using disc-shaped spacer elements 22 of various diameters and/or by releasably attaching said disc-shaped spacer element 22 (of a given diameter) at different positions on said side face of the cleaning head 18. For instance, screw 40 may movable in a long hole (not shown) extending in the radial direction of the filter element 14 and formed in said side face of the cleaning head 18 so as to be able to change said spacing in a continuous manner. Alternatively, said side face may be provided with separate holes through which said screw 40 may extend and be fastened, wherein those holes are preferably arranged along a line in the radial direction of said filter element.

It is thus possible to substantially reduce or even altogether avoid abrasive wear acting on the cleaning head 18 and the restriction elements 36 using the spacer elements 22 described above. Since said spacer elements 22 are rotatably supported on said cleaning head 18, abrasive wear and friction are reduced to a minimum. Since both the size of the opening and the (minimum) spacing can be precisely defined in the fashion described above, the effected cleaning action can be precisely controlled.

While the present invention has been described in detail, it is obvious to the person skilled in the art that certain variations and modifications thereto are possible without departing from the scope of the invention as defined by the claims appended hereto.

The invention claimed is:

1. A filter module comprising:
a housing having a fluid inlet and a fluid outlet, said housing enclosing a tubular, elongate filter element defining a longitudinal axis and a cleaning head connected by means of a conduit to a coaxially arranged and rotatably mounted pipe, said cleaning head being resiliently biased towards the internal surface of said tubular, elongate filter element, wherein said cleaning head has an opening of adjustable size facing said internal surface of said filter element and providing fluid communication between the interior of said housing and the interior of said pipe;
means for creating a pressure difference between the interior of said housing and the interior of said pipe so as to cause a fluid flow from the interior of said housing to the interior of said pipe;
means for effecting a rotation of said pipe; and
a spacer element rotatably supported on and releasably attached to said cleaning head, said spacer element defining the minimum spacing between the cleaning head and the internal surface of said filter element.

2. The filter module according to claim 1 comprising at least a second cleaning head connected by means of a second conduit to the pipe, said second cleaning head being resiliently biased towards the internal surface of said tubular, elongate filter element, having at least a further spacer element rotatably supported thereon and releasably attached thereto, and having an opening of adjustable size facing said internal surface of said filter element and providing fluid communication between the interior of said housing and the interior of said pipe, wherein the cleaning heads are offset angularly and in the direction of the longitudinal axis relative to one another.

3. The filter module according to claim 1, wherein the position of said spacer element on said cleaning head is adjustable to control the minimum spacing between the cleaning head and the internal surface of said filter element.

4. The filter module according to claim 1, wherein said spacer element is shaped like a disc.

5. The filter module according to claim 1, wherein said spacer element is made of a material which is softer than the material of said filter element.

6. The filter module according to claim 1, wherein said cleaning head extends along the longitudinal axis of said filter element, said cleaning head having a first end and an opposed second end.

7. The filter module according to claim 1, wherein said opening is a slit.

8. The filter module according to claim 7, wherein said opening is orientated substantially parallel to the longitudinal axis of said filter element.

9. The filter module according to claim 6, wherein said opening extends between the first end and the second end of said cleaning head.

10. The filter module according to claim 1, wherein said spacer element is arranged at one of said first and second ends of said cleaning head.

11. The filter module according to claim 1, wherein the axis of rotation of said rotatably supported spacer element is arranged substantially parallel to the longitudinal axis of said filter element.

12. The filter module according to claim 1, wherein a first spacer element is rotatably supported on and releasably attached to said first end of said cleaning head and a second spacer element is rotatably supported on and releasably attached to said second end of said cleaning head.

13. The filter module according to claim 1, wherein the size of the opening is adjustable by means of restriction elements being releasably attached to said cleaning head.

14. The filter module according to claim 13, wherein the size of the opening is adjustable by replacing a given restriction element with another one having a different size.

15. The filter module according to claim 13, wherein the size of the opening is adjustable by rearranging a given restriction element and releasably attaching the same at a different position on said cleaning head.

16. The filter module according to claim 1, wherein, in addition to or instead of the pipe being rotatably mounted, the tubular, elongate filter element is rotatably mounted inside said housing.

* * * * *